(12) United States Patent
Shiratsuki et al.

(10) Patent No.: US 6,657,185 B2
(45) Date of Patent: Dec. 2, 2003

(54) PATTERN DETECTOR FOR CAPTURING IMAGES WITH REDUCED DISTORTION

(75) Inventors: Akihide Shiratsuki, Tokyo (JP); Masahiro Shikai, Tokyo (JP); Hajime Nakajima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 122 days.

(21) Appl. No.: 09/725,184

(22) Filed: Nov. 29, 2000

(65) Prior Publication Data

US 2001/0005004 A1 Jun. 28, 2001

(30) Foreign Application Priority Data

Nov. 30, 1999 (JP) .......................... 11-339507

(51) Int. Cl.$^7$ .............. G02B 5/00; G06K 9/74
(52) U.S. Cl. .............. 250/227.2; 250/227.28; 250/556; 340/5.83; 356/71; 382/127
(58) Field of Search .............. 250/227.11, 227.2, 250/227.28, 227.29, 556; 356/71; 382/116, 124, 125, 126, 127; 118/31.5; 340/5.52, 5.53, 5.83; 396/15; 902/3, 6

(56) References Cited

U.S. PATENT DOCUMENTS

| 4,537,484 A | * | 8/1985 | Fowler et al. ................ 356/71 |
| 5,426,296 A | | 6/1995 | Shikai et al. |
| 5,621,516 A | * | 4/1997 | Shinzaki et al. ............... 356/71 |
| 5,900,993 A | * | 5/1999 | Betensky ..................... 356/71 |
| 6,122,394 A | * | 9/2000 | Neukermans et al. ......... 356/71 |

FOREIGN PATENT DOCUMENTS

JP          6-83944          3/1994

* cited by examiner

*Primary Examiner*—Stephone B. Allen
(74) *Attorney, Agent, or Firm*—Leydig, Voit & Mayer, Ltd.

(57) ABSTRACT

An irregular pattern detector includes a first optical system, a transparent light guide body and a second optical system. The first optical system has a light source. The transparent light guide body has an incident face receiving incident light from the light source of the first optical system, a detection face facing the incident face for placing of a subject having an irregular pattern, a curved surface reflecting scattered light from the detection face, an optical absorbing face facing the curved surface and having an opening outputting light reflected from the curved surface. The second optical system, such as an imaging lens, guides the light from the opening of the optical absorbing face of the transparent light guide body to a camera device. This irregular pattern detector can be scaled down, and can produced precise images without any deformation.

11 Claims, 16 Drawing Sheets

PATTERN DETECTOR FOR CAPTURING IMAGES WITH REDUCED DISTORTION

BACKGROUND OF THE INVENTION

1. Field of the Invention

The present invention relates to an irregular pattern detector, which captures, as images, irregular patterns, such as fingerprints.

2. Description of the Prior Art

A fingerprint ID apparatus is known as one of means of identifying persons. The fingerprint ID apparatus is constituted substantially by a pattern detection part capturing an irregular pattern of a fingerprint as an image, and a processing part for processing the images captured by the pattern detection part. Improvements in irregular pattern detectors such as the fingerprint ID apparatus have resulted in improved performance of the fingerprint ID apparatus.

FIG. 1 is a partially sectioned view of constitution of a conventional irregular pattern detector disclosed in Japanese Patent Application Laid-open No. 6-83944. In this drawing, the conventional irregular pattern detector has a light guide body 102 made of transparent materials such as glass or acrylic resin. A plane 103 is touched by subjects 101 such as a finger, the finger having irregular patterns thereon. A plane 104 intersects the plane 103 at a suitable angle and receives an illuminating light L100 therein. A plane 105 reflects a reflection light L101, which is reflected by the irregular patterns of the subject 101 placed on the plane 103, and controls the reflection light L101 approximately parallel to the plane 103. An imaging lens 108 focuses the reflection light L101 onto a camera device 109. A reflection mirror 110 reflects light from the imaging lens 108 at an angle to guide the reflection light to the camera device 109.

The plane 104 is flush with the plane 105. Therefore, an angle β of the plane 104 or the plane 105 with respect to the plane 107 facing the plane 106 is set to 20°, for example. An interface between the subject 101 and the plane 103 is further irradiated with the reflection light L101 from outside of the plane 104. The reflection light L101 reflected by the irregular patterns of the subject 101 is further reflected by the plane 105, focused by the imaging lens 108, and reflected by the reflection mirror 110. Consequently, images of the irregular patterns of the subject 101 are taken by the camera device 109 such as a CCD, for example.

FIG. 2 is a partially sectioned view of a simplified optical system, which is similar to the conventional irregular pattern apparatus as shown in FIG. 1. In FIG. 2, as compared with FIG. 1, the plane 103 corresponds to a plane 111, the plane 105 corresponds to a mirror 112, the imaging lens 108 corresponds to a lens 113, and the camera device 109 corresponds to a plane 114. A plane 115 and the plane 111 are related with respect to the mirror 112 as mirror images. The plane 115 is not perpendicular to an optical axis of the lens 113, and accordingly variations in the distance from points A, B and C on the plane 115 to the lens 113 occur, and variations of optical magnification at points A', B' and C' occur. FIGS. 3A and 3B are plan views of images, respectively, in the optical system as shown in FIG. 2. In FIG. 3A, a rectangular image of the subject 101 placed on the plane 111 is illustrated. In FIG. 3B, an image formed on the plane 114 is illustrated. As illustrated in FIG. 3A, when the image of the subject placed on the plane 111 has a rectangular shape, the image formed on the plane 114 has a trapezoidal shape owing to the lens 113 as illustrated in FIG. 3B.

When distance BB' is reduced in order to scale down the irregular pattern detector, angles of line BB' with respect to line AA' or line BB' are enlarged, respectively. In this case, the aforementioned deformation of the image is conspicuous.

As illustrated in FIG. 2, line DE crosses the optical axis of the lens 113 at a right angle, and line AC tilts toward the optical axis. Therefore, as illustrated in FIGS. 3A and 3B, the length in a direction of line AC is shortened as compared with the length in a direction of line DE. The ratio of a longitudinal direction to a lateral direction of the subject 101 placed on the plane 111 as a detection face is different from the ratio of a longitudinal direction to a lateral direction of the image formed on the plane 114 as a light-detecting face, and accordingly precise images are not obtained.

SUMMARY OF THE INVENTION

Accordingly, it is an object of the present invention to provide a compact irregular pattern detector, which obtains precise images without any deformation.

In order to achieve the object of the present invention, an irregular pattern detector comprises an irregular pattern detector, including a first optical system having a light source; a transparent light guide body having an incident face receiving incident light from the light source of the first optical system, a detection face provided to face the incident face and for placing a subject thereon, a curved surface reflecting scattering light from the detection face, an optical absorbing face provided to face the curved surface and having an opening part outputting the reflection light from the curved surface; and a second optical system for guiding the light from the opening part of the optical absorbing face of the transparent light guide body to a camera device.

Here, the transparent light guide body may be provided on the first optical system.

The scattering light may be directly reflected with the curved surface to guide through the opening part to outside.

The curved surface of the transparent light guide body may be a spherical mirror, and a spherical radius of the spherical mirror may be twice as long as distance between a central point of the spherical mirror and an intersection point intersecting the spherical radius passing the central point of the spherical mirror with a perpendicular extending from a center of the opening part to the spherical radius.

The spherical mirror may form a telecentric system at a side of the subject, and the second optical system may form a telecentric system at an imaging side.

The curved surface of the transparent light guide body may be a spherical mirror, and a spherical radius of the spherical mirror may be within the range of 1.7 to 1.9 times as long as distance between a central point of the spherical mirror and an intersection point intersecting the spherical radius passing the central point of the spherical mirror with a perpendicular extending from a center of the opening part to the spherical radius.

The second optical system may correct longitudinal and lateral magnification of the light from the opening part to guide the corrected light to the camera device.

The detection face of the transparent light guide body may be a cylindrical shaped side face.

The second optical system may bend the light from the opening part to guide the light to the camera device.

The light source of the first optical system may be a light-emitting diode array provided on a substrate, and the camera device may be provided on the substrate.

The light source of the first optical system may be a light-emitting diode array provided on a substrate, and the incident face of the transparent light guide body may be constituted by a plurality of curved surfaces.

DESCRIPTION OF THE PREFERRED EMBODIMENT OF THE INVENTION

One embodiment according to the present invention will be described as follows:

Embodiment 1

Figure 4:
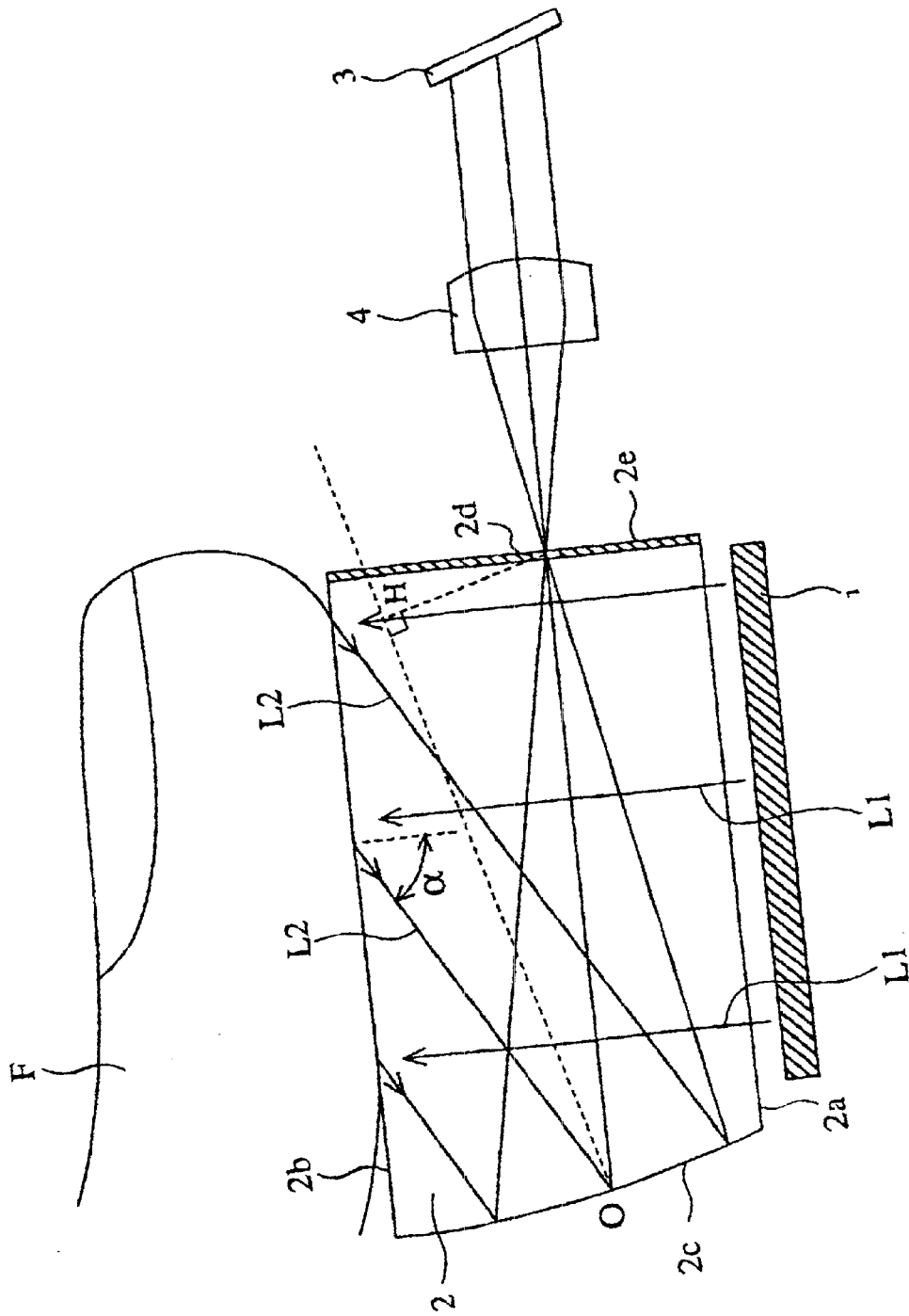
FIG. 4 is a partially sectioned view of the constitution of an irregular pattern detector as embodiment 1 according to the present invention.

FIG. 4 is a partially sectioned view of constitution of an irregular pattern detector as embodiment 1 according to the present invention. In the drawing, F denotes a human finger as a subject, 1 denotes a light source of constituting a first optical system, and 2 denotes a transparent light guide body which is made of transparent materials such as acrylic resin.

The transparent light guide body 2 has an incident face 2a receiving an incident light L1 from the light source 1, a detection face 2b provided to face the incident face 2a and for placing the finger F having an irregular pattern (not shown) thereon, a spherical mirror 2c as a curved surface reflecting scattering light from the detection face 2b, an optical absorbing face 2e provided to face the spherical mirror 2c and having an opening part 2d outputting the reflection light from the spherical mirror 2c.

3 denotes a camera device such as CCD and so on. 4 denotes an imaging lens for focusing light derived from the opening part 2d on the camera device 3. The imaging lens 4 is provided at the outside of the opening part 2d of the optical absorbing face 2e. The spherical mirror 2c and the optical absorbing face 2e are arranged to be tangent to the detection face 2b at edges, respectively.

The finger having irregular patterns (not shown) thereon is placed on the detection face 2b. The spherical mirror 2c is produced by vapor deposition using materials such as aluminum. The light-emitting diodes are used as the light source 1, light from the light source 1 is regularly reflected by the detection face 2b not so as to guide the light to the camera device 3. The light source 1 is arranged at an opposite side to the detection face 2b, relative to the transparent light guide body 2. L1 denotes an incident light, and the incident light L1 is irradiated from the light source 1 to the detection face 2b through the incident face 2a of the transparent light guide body 2. L2 denotes an optical path that the incident light L1 scattered from the detection face 2b reaches the camera device 3 via the spherical mirror 2c, the opening part 2d and the imaging lens 4. The imaging lens 4 and the camera device 3 are disposed at positions, respectively, where the scattering light passed through the imaging lens 4 focuses on the camera device 3. The aforementioned elements are disposed so that angle α of the scattering light reaching the camera device through the spherical mirror 2c with respect to a normal of the detection face 2b is larger than a critical angle between the transparent light guide body 2 and air.

The principle of motion used for capturing image of the irregular patterns will be described as follows:

When the finger F having the irregular patterns (not shown) thereon makes contact with the detection face 2b, a projection (not shown) formed on the irregular patterns makes close contact with the detection face 2b. An air layer (not shown) is however formed between a hollow (not shown) on the irregular patterns and the detection face 2b because the hollow (not shown) does not make close contact with the detection face 2b. When the light derived from the light source 1 via the transparent light guide body 2 is irradiated to the detection face 2b, the light irradiated toward the projection (a portion making close contact with the detection face 2b) formed on the finger F is scattered in the transparent light guide body 2 in all directions, a part of the scattering light is reflected by the spherical mirror 2c, and the reflective light passes through the opening part 2d to form an image on the camera device 3 by the imaging lens 4. On the other hand, the light irradiated toward the hollow formed on the finger F passes through the air layer (not shown) to scatter in the transparent light guide body 2. Since an angle of the scattering light with respect to the normal of the detection face 2b is smaller than the critical angle between the transparent light guide body 2 and the air layer, the scattering light cannot attain to the camera device 3.

As described above, only the scattering light derived from the projection formed on the finger F is reaching the camera device 3. Image capture for the fingerprint as irregular patterns of the finger F can be performed.

In the embodiment 1, the spherical radius of the spherical mirror 2c is set to twice as long as the distance of OH as shown in FIG. 4. Here, a point O is a center of the spherical mirror 2c, and a point H is an intersection point intersecting the spherical radius passing the central point of the spherical mirror 2c with a perpendicular extending from a center of the opening part 2d to the spherical radius. The focus of the spherical mirror 2c matches the center of the opening part 2d, and accordingly a telecentric optical system is formed at a side of the subject.

It is also designed so that focus of the imaging lens 4 matches the center of the opening part 2d, and accordingly a telecentric optical system is formed at an imaging side. It is necessary that the imaging lens 4 is provided at the outside of the transparent light guide body 2 and at a position being slightly apart from the opening part 2d, and it is further necessary to enlarge a diameter of the imaging lens 4.

The chief ray of the scattering light, which is reflected at points on the detection face 2b to form image on the camera device 3, is parallel to each other, and irradiated toward the spherical mirror 2c. The chief ray of the scattering light derived from the imaging lens 4 is parallel to each other and is guided onto the camera device 3.

As explained above, in the embodiment 1, the spherical mirror 2c forms the telecentric optical system on the side of the subject, and the imaging lens 4 forms the telecentric optical system on the imaging side. Therefore, the optical magnification at each point does not depend on the distance between the subject and the imaging lens 4, and on the distance between the imaging lens 4 and the camera device 3. The irregular pattern detector can correct the trapezoidal distortion generated in the conventional detector.

Embodiment 2

Figure 5:
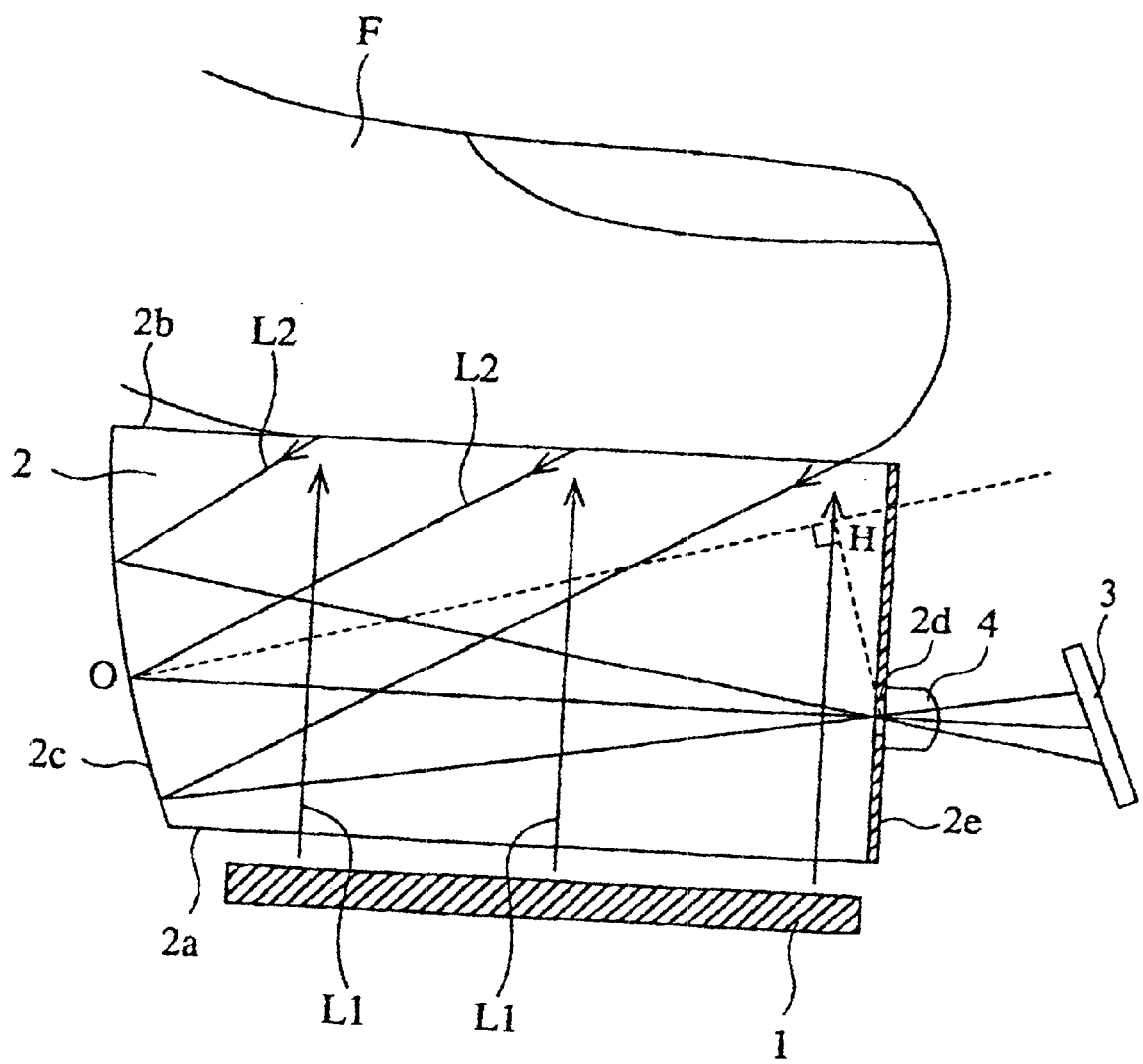
FIG. 5 is a partially sectioned view of the constitution of an irregular pattern detector as embodiment 2 according to the present invention.

FIG. 5 is a partially sectioned view of constitution of an irregular pattern detector as the embodiment 2 according to the present invention. Common numerals denote common elements of the embodiment 2 to elements of the embodiment 1, and the description of such parts is omitted.

In the embodiment 1, a telecentric spherical mirror 2c on the side of the subject and a telecentric imaging lens 4 arranged at a position apart from the optical absorbing face 2e on the imaging side are used. In the embodiment 2, the spherical radius of the spherical mirror 2c is within the range of 1.7 to 1.9 times as long as distance of OH, and the imaging lens makes close contact with the opening part 2d from the transparent light guide body 2.

The principle of motion used for capturing image of the irregular patterns in the embodiment 2 is the substantially same as that of the embodiment 1.

Figure 6:
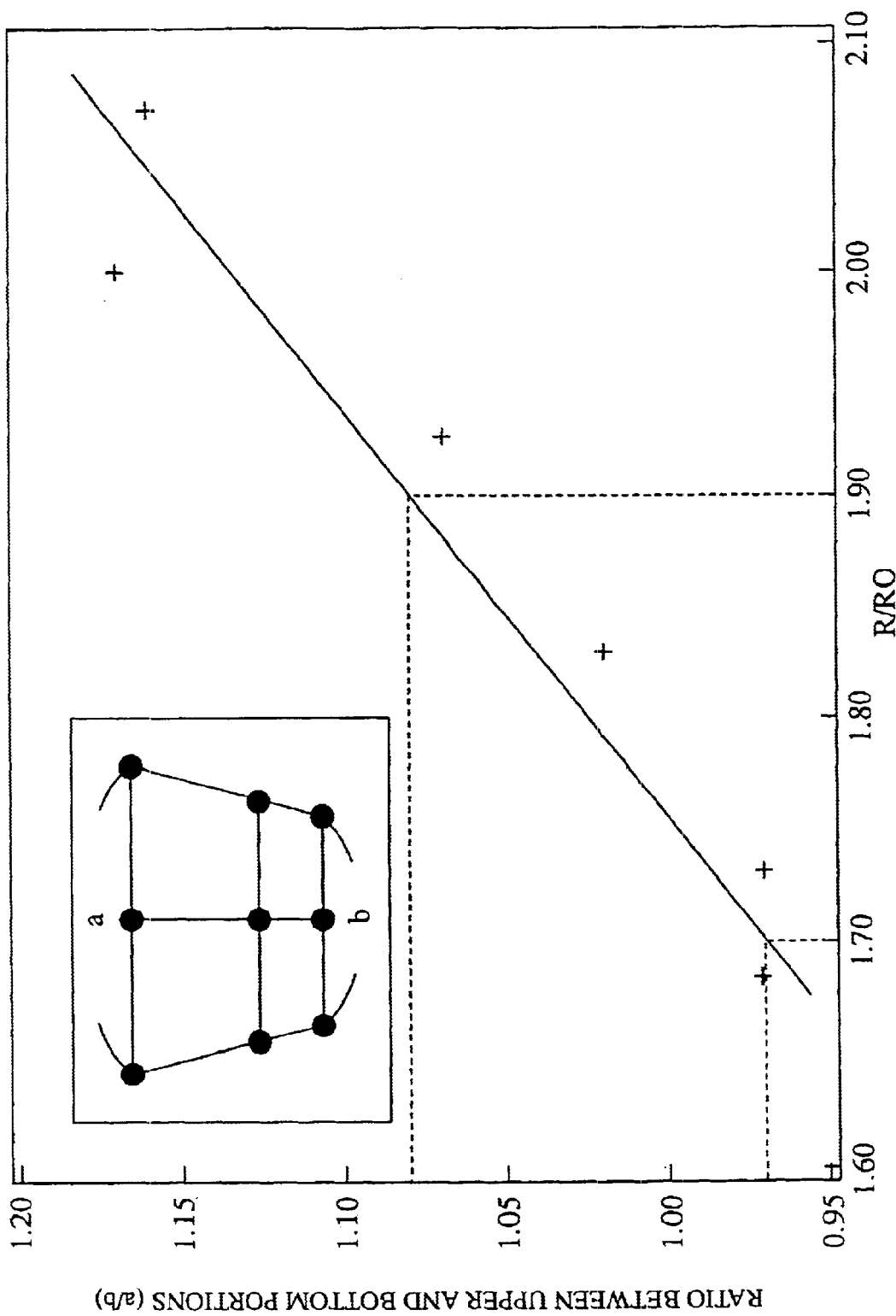
FIG. 6 is a graph illustrating the relation of a radius R of a spherical mirror with respect to trapezoidal distortion on the basis of a simulation using the apparatus of the embodiment 2.

FIG. 6 is a graph of illustrating the relation of a radius R of a spherical mirror 2c with respect to trapezoidal distortion on the basis of a simulation using the apparatus of the embodiment 2. A trapezoidal image shown in FIG. 6 designates an image formed on the camera device 3, "a" denotes an upper side of the trapezoidal image, and "b" denotes a bottom side of the trapezoidal image. A sign "+" shown in FIG. 6 is a mark designating an optical simulation result. The spherical radius R of the spherical mirror 2c that the trapezoidal distortion becomes the smallest, the radius R establishes the relation of 1.7RO<R<1.9RO wherein the distance between the point O and the point H is defined as RO.

As described above, in the embodiment 2, the trapezoidal distortion is not limited to the correction used in embodiment 1. The diameter of the imaging lens 4 can also be scaled down as compared with the embodiment 1 because it is not necessary to use the telecentric optical system on the imaging side. Therefore, the cost of production of the detector of the embodiment 2 can be reduced.

In the embodiment 2, since the imaging lens 4 makes close contact with the outside of the transparent light guide body 2, the whole length of the irregular pattern detector can be shortened as compared with the embodiment 1. Therefore, the detector of the embodiment 2 can be scaled down.

Embodiment 3

Figure 7:
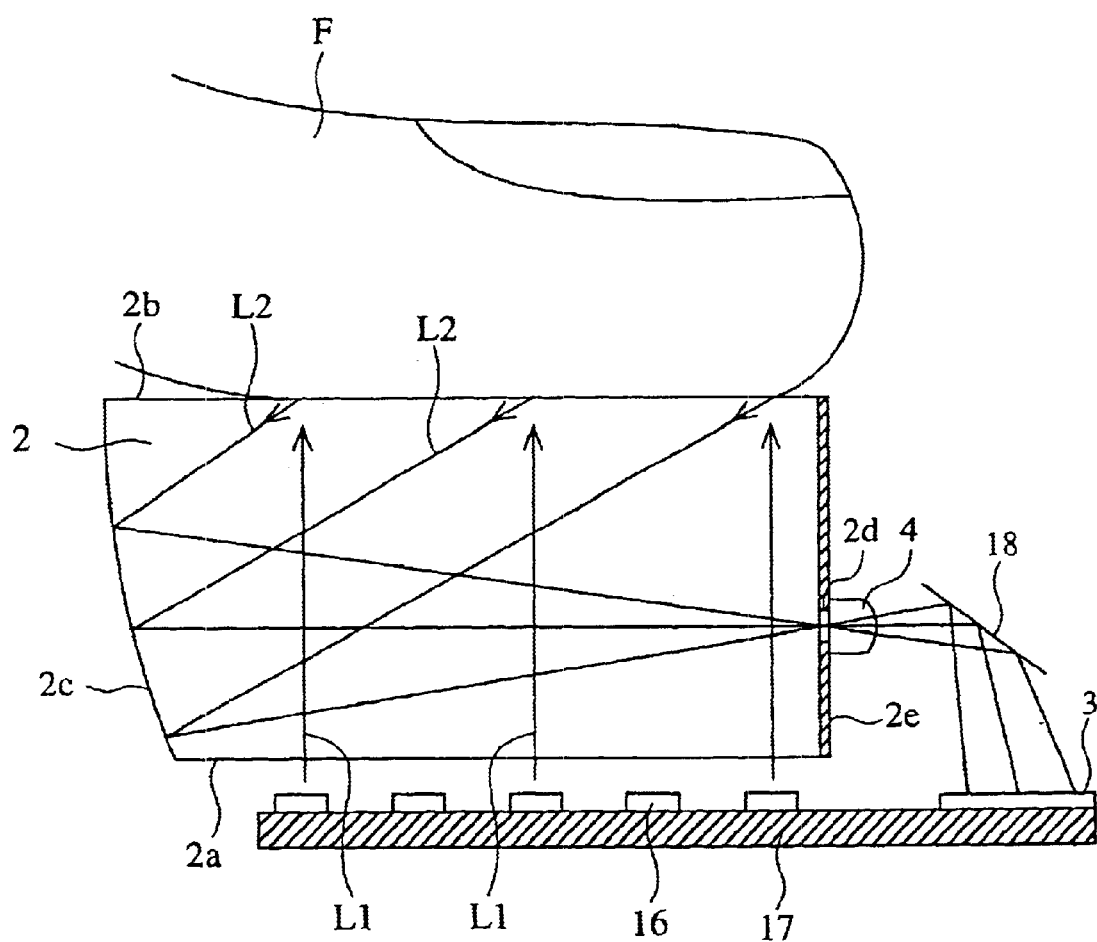
FIG. 7 is a partially sectioned view of the constitution of an irregular pattern detector as embodiment 3 according to the present invention.

FIG. 7 is a partially sectioned view of constitution of an irregular pattern detector as embodiment 3 according to the present invention. Common numerals denote common elements of the embodiment 3 to elements of the embodiments 1 and 2, and the description of such parts is omitted. In the drawing, 16 denotes a light-emitting diode array as the light source 1, 17 denotes a substrate disposed beneath the transparent light guide body 2, and 18 denotes a mirror for bending the optical path L2. The light-emitting diode array 16 and the camera device 3 are arranged on the common substrate 17.

In the embodiment 3, the scattering light from the imaging lens 4 is bent by the mirror 18 to guide to the camera device 3 arranged on the substrate 17.

The principle of motion used for capturing image of the irregular patterns in the embodiment 3 is the substantially same as that of the embodiment 1.

The optical path L2 of the scattering light after passing through the imaging lens 4 is bent by the mirror 18 and is guided to the camera device 3. In this case, since the light-emitting diode array 16 and the camera device 3 are arranged on the substrate 17 beneath the transparent light guide body 2, it is possible to constitute a plurality of electric circuits on one substrate, and to reduce the cost of production.

Alternatively, a curved surface or a prism may be also used instead of the mirror 18.

Embodiment 4

Figure 8:
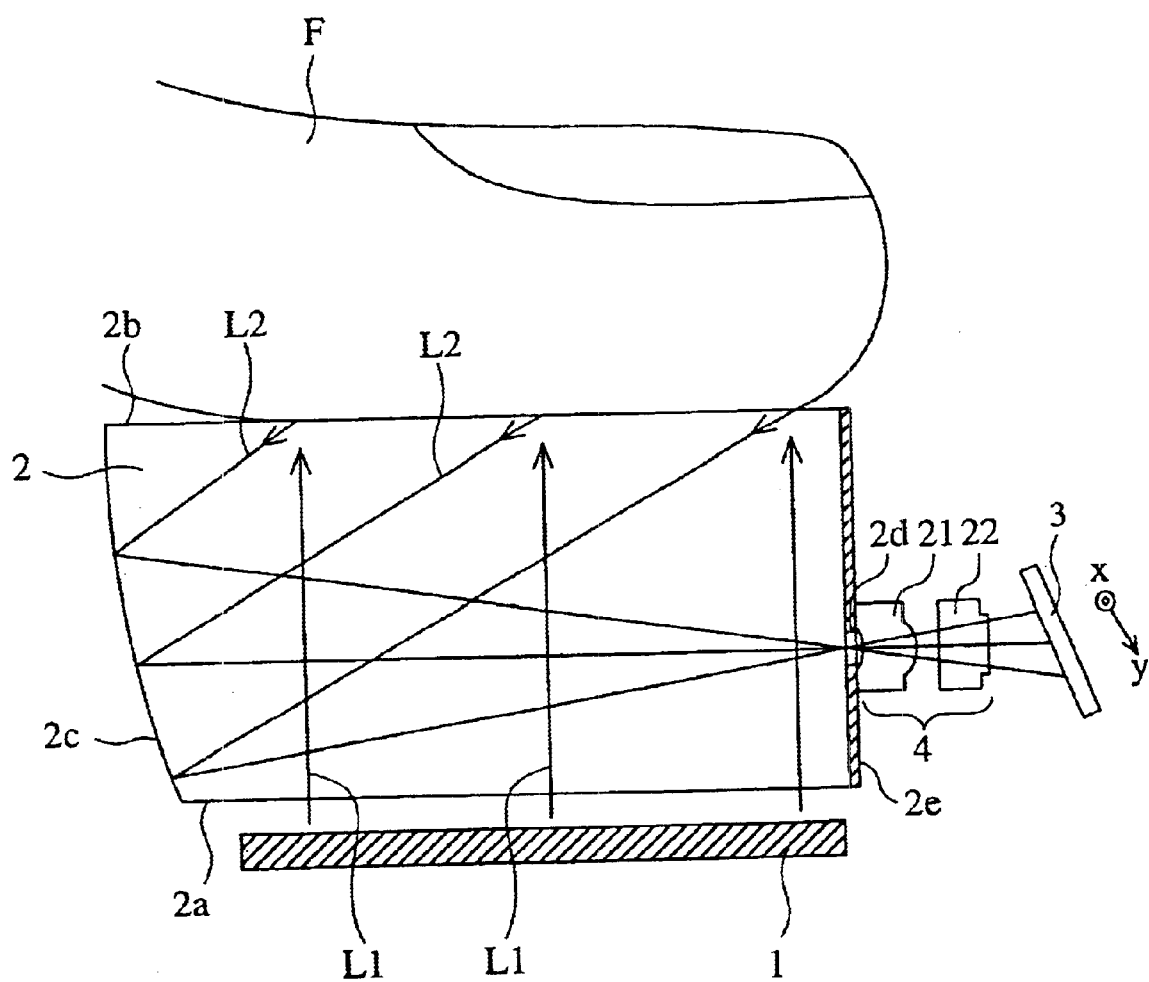
FIG. 8 is a partially sectioned view of the constitution of an irregular pattern detector as embodiment 4 according to the present invention.

FIG. 8 is a partially sectioned view of constitution of an irregular pattern detector as embodiment 4 according to the present invention. Common numerals denote common elements of the embodiment 4 to elements of the embodiments 1 to 3, and the description of such parts is omitted. In the drawing, 21 denotes a toroidal lens, and 22 denotes an anamorphic lens. The imaging lens 4 is constituted by the toroidal lens 21 and the anamorphic lens 22.

In the embodiment 4, the toroidal lens 21 and the anamorphic lens 22 are arranged at positions, respectively, where the substantial irregular pattern on the detection face 2b and the irregular pattern image formed on the camera device 3 are equal with respect to ratios of the longitudinal direction and the lateral direction.

The principle of motion used for capturing image of the irregular patterns in the embodiment 4 is the substantially same as that of the embodiment 1.

Figure 9:
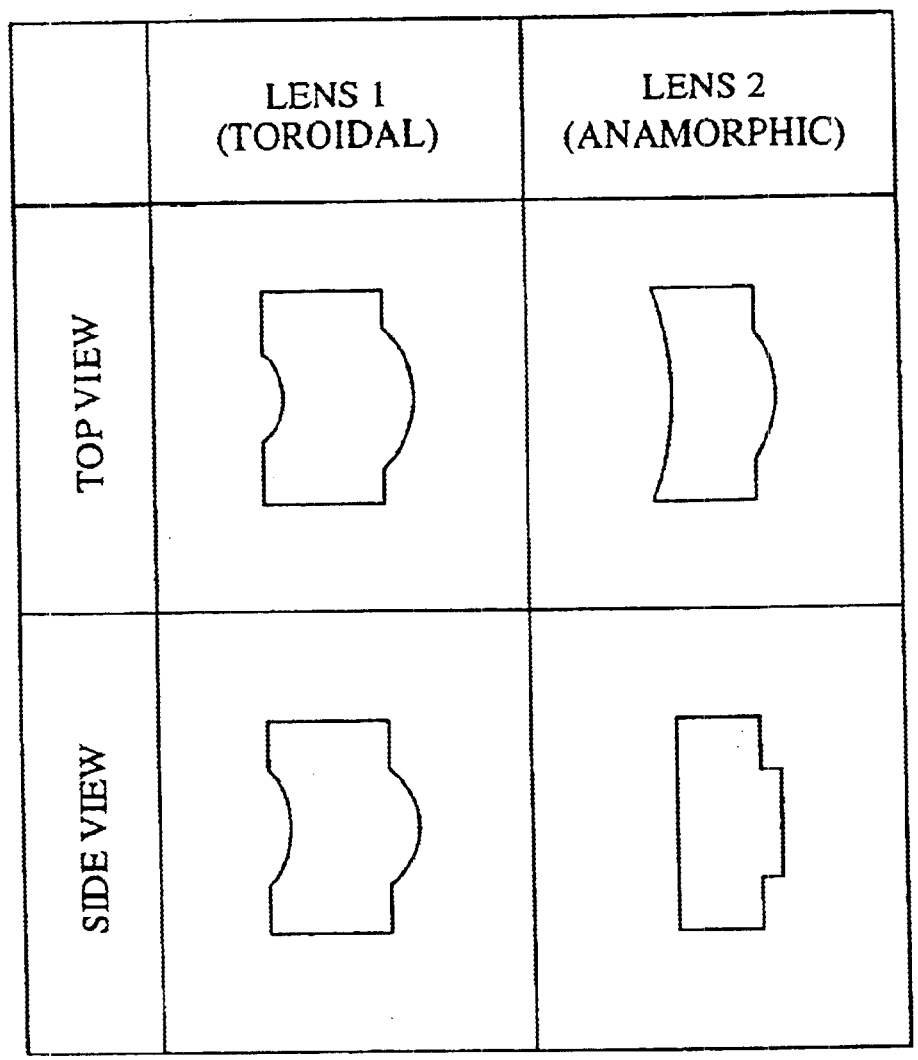
FIG. 9 is a table in which cross sectional views of a toroidal lens and an anamorphic lens of FIG. 8 are shown.
Figure 10:
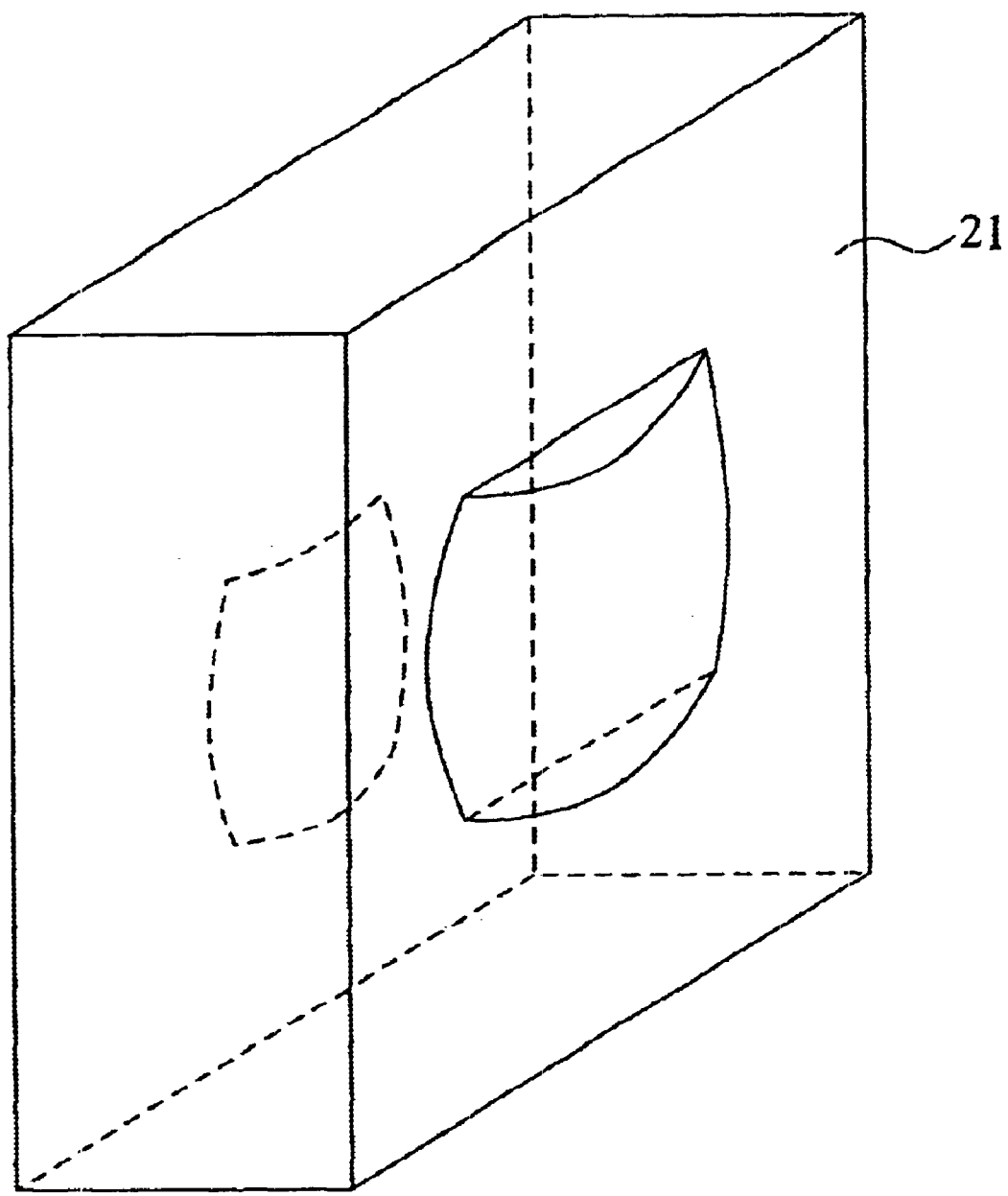
FIG. 10 is a perspective view of the toroidal lens.
Figure 11:
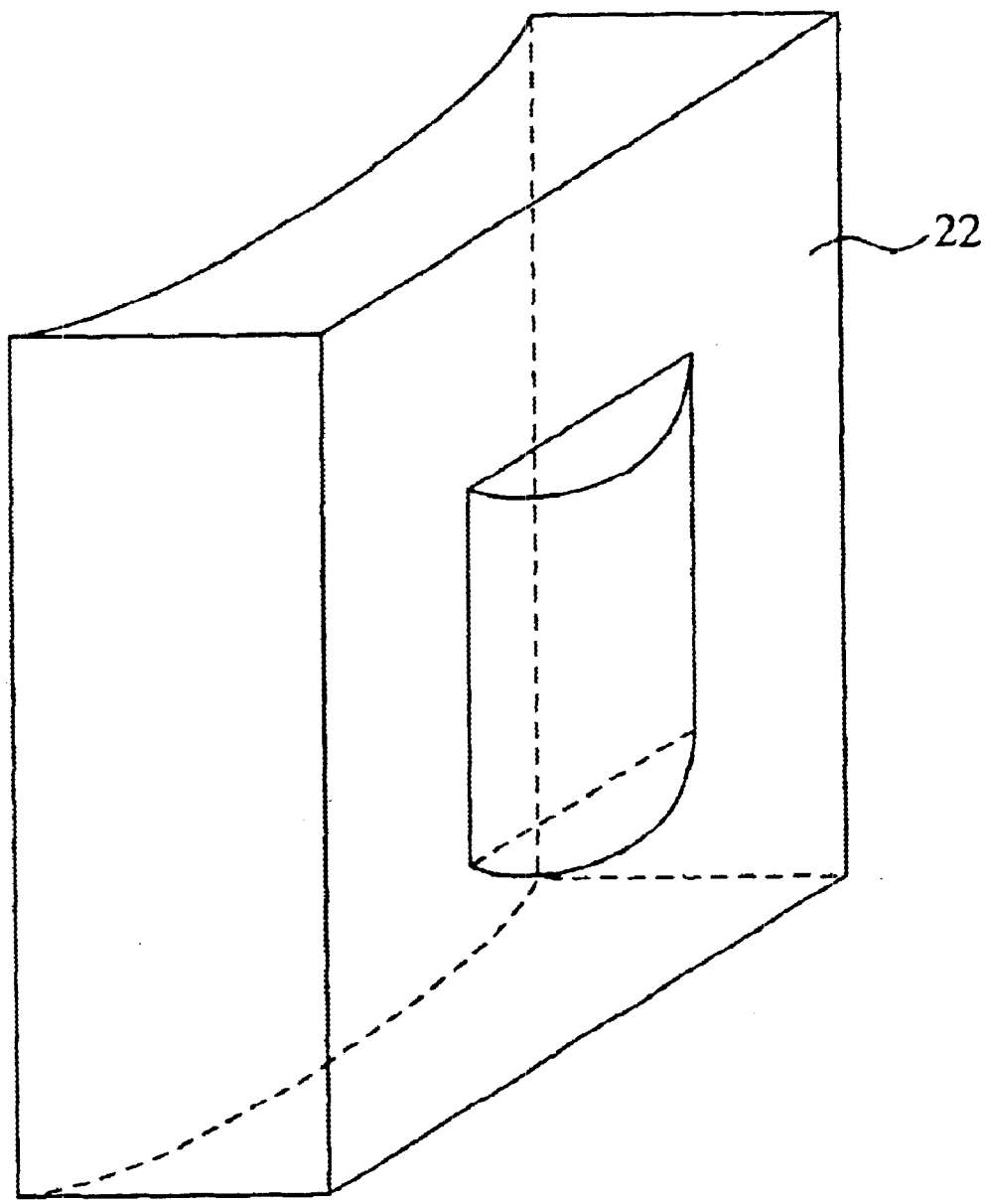
FIG. 11 is a perspective view of the anamorphic lens.

In the embodiment 4, since the combination of the toroidal lens 21 and the anamorphic lens 22 is used, the magnification of longitudinal and lateral directions can be improved at the front and rear of such lenses. Further, the substantial irregular pattern on the detection face 2b and the irregular pattern image formed on the camera device 3 can be equal with respect to ratios of the longitudinal direction and the lateral direction. Here, the toroidal lens 21 means that the surface of lens has a surface shape formed by rotating a curve or a straight line on an optical axis, and the anamorphic lens 22 means that the surface of lens has a cylindrical shaped side face. As illustrated in FIG. 8, in the embodiment 4, the magnification in the x axial direction and the focal length can be optimized by the toroidal lens 21 and the anamorphic lens 22, and the magnification in the y axial direction and the focal length can be optimized by the toroidal lens 21. FIG. 9 is a table on which cross sectional views of toroidal lens 21 and anamorphic lens 22 of FIG. 8 are listed up. FIG. 10 is a perspective view of the toroidal lens 21. FIG. 11 is a perspective view of the anamorphic lens 22.

Figure 12:
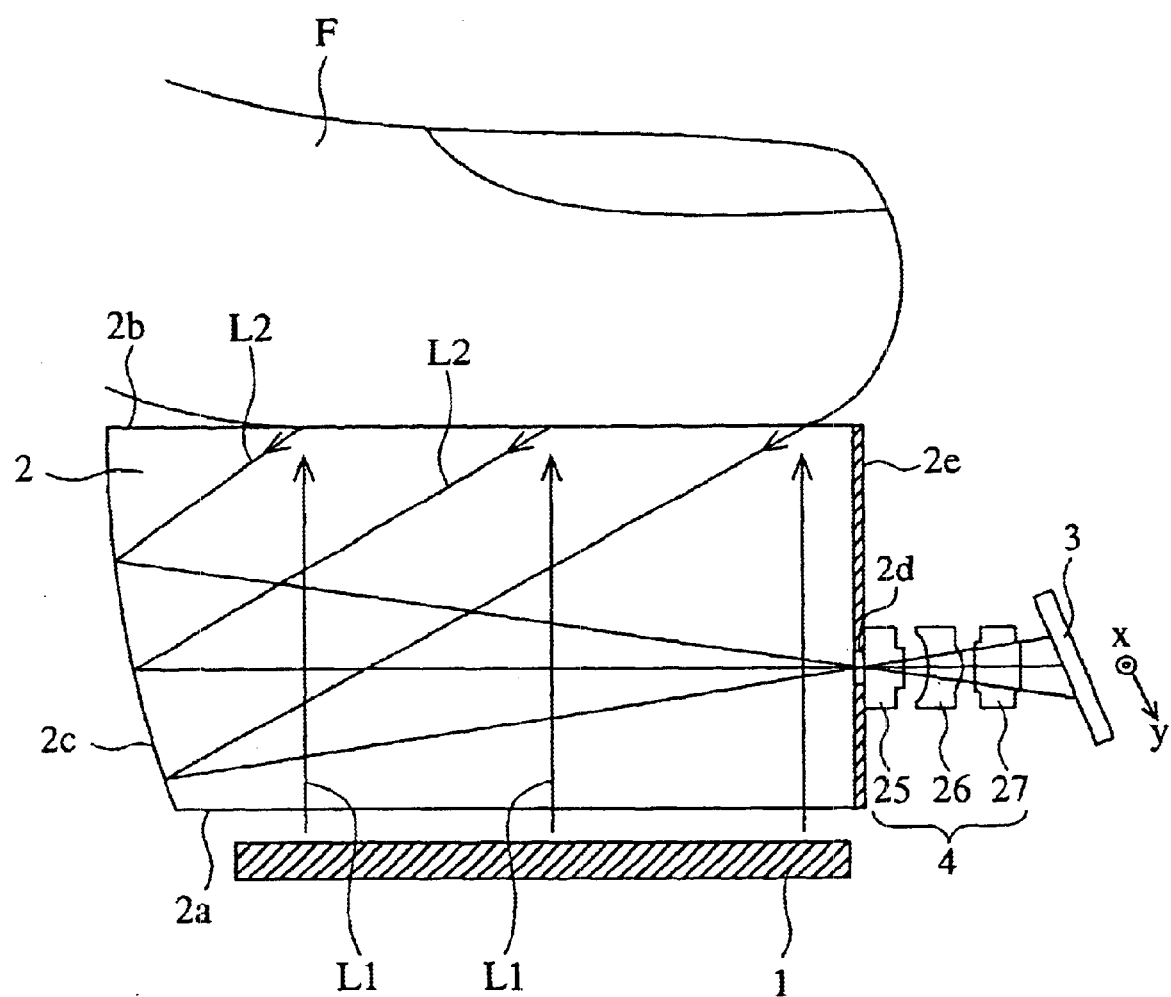
FIG. 12 is a partially sectioned view of another constitution of the irregular pattern detector as embodiment 4.
Figure 13:
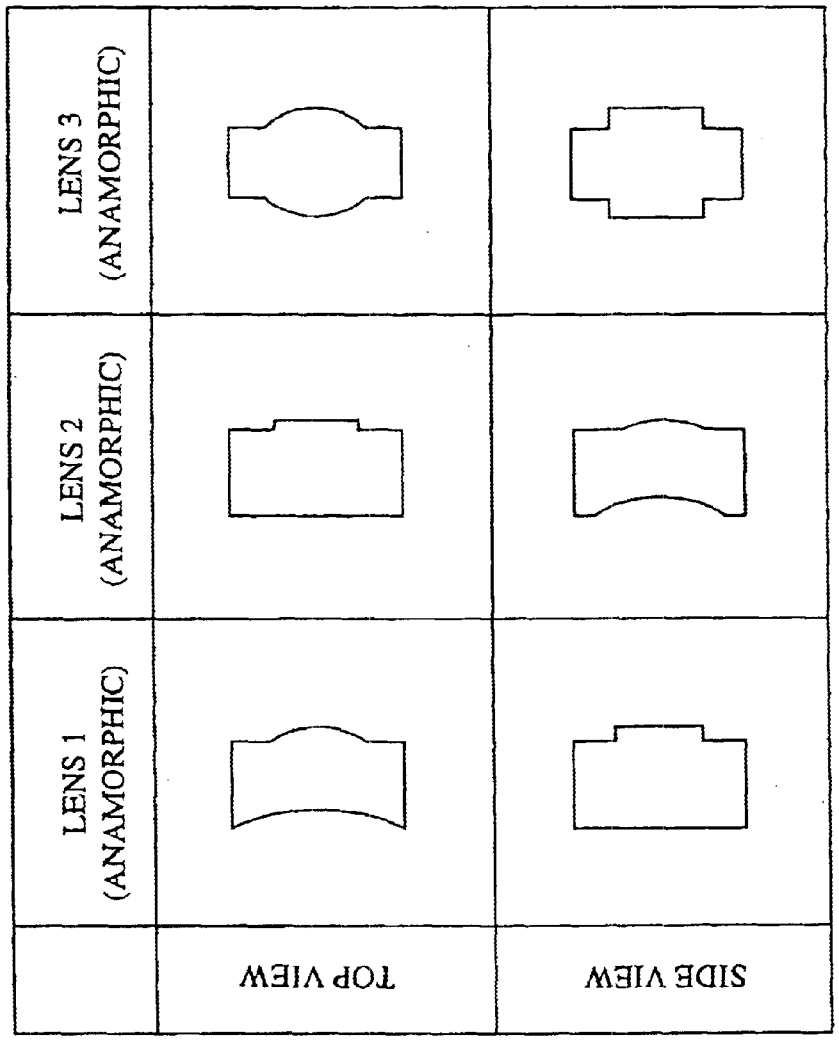
FIG. 13 is a table in which cross sectional views of the respective anamorphic lenses are shown.

FIG. 12 is a partially sectioned view of another constitution of the irregular pattern detector as embodiment 4. Reference numerals 25 to 27 are anamorphic lenses respectively, and constitutes the imaging lens 4. As illustrated in FIG. 12, the combination of three anamorphic lenses 25 to 27 results in making an optical lens system in which the longitudinal and lateral magnification are different from each other. In the embodiment 4, the anamorphic lenses 25 and 27 can optimize an optical magnification and a focal length in an x-axis direction, and the anamorphic lens 26 can optimize an optical magnification and a focal length in a y-axis direction. FIG. 13 is a table on which cross sectional views of the respective anamorphic lens 25 to 27 are listed up.

Embodiment 5

Figure 14:
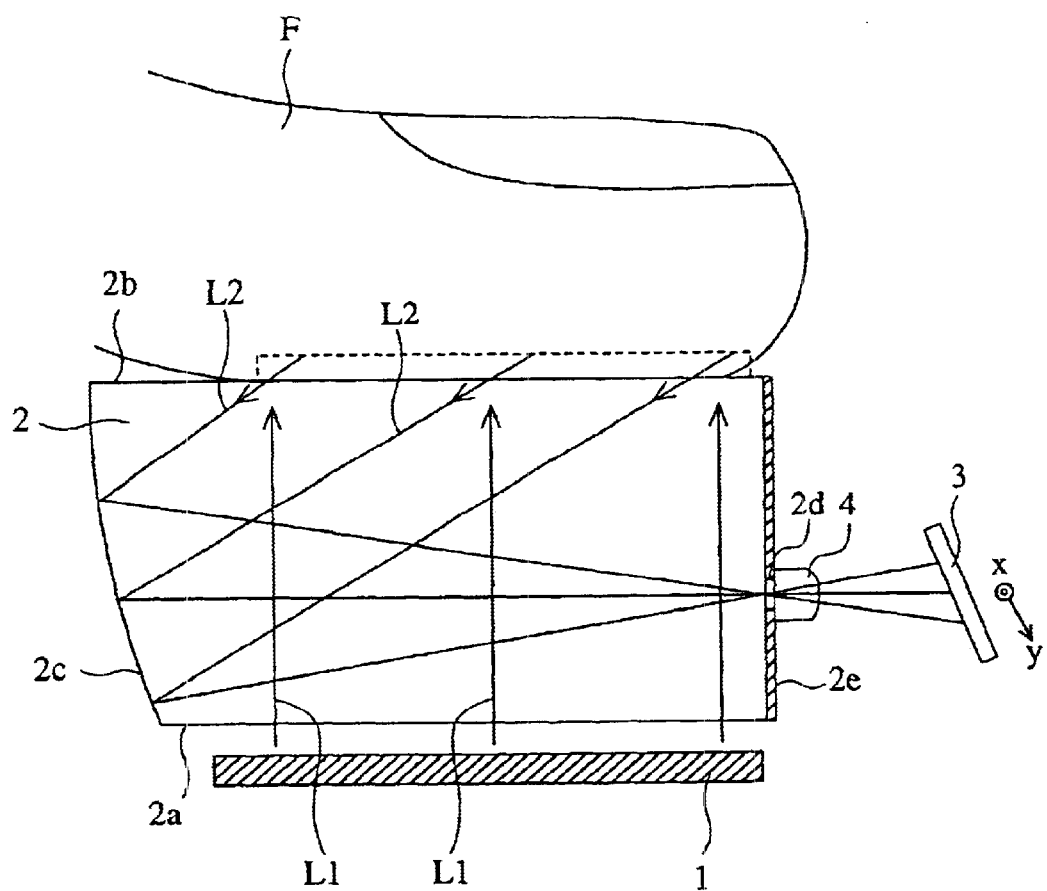
FIG. 14 is a partially sectioned view of the constitution of an irregular pattern detector as embodiment 5 according to the present invention.
Figure 15:
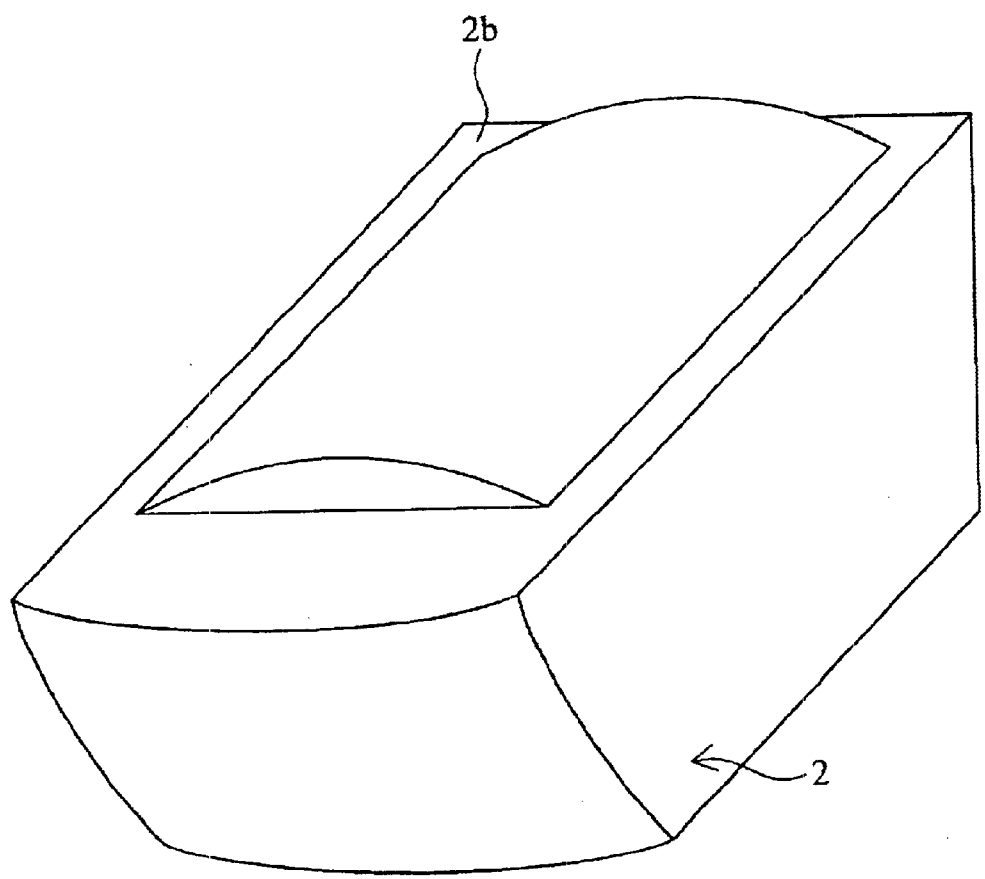
FIG. 15 is an enlarged perspective view of a transparent light guide body illustrated in FIG. 14.

FIG. 14 is a partially sectioned view of the constitution of an irregular pattern detector as embodiment 5 according to the present invention, and FIG. 15 is an enlarged perspective view of a transparent light guide body illustrated in FIG. 14. Common numerals denote common elements of the embodiment 5 to elements of the embodiments 1 to 4, and the description of such parts is omitted. The detection face 2b of the transparent light guide body 2 is a cylindrical shaped side face.

Figure 16A:
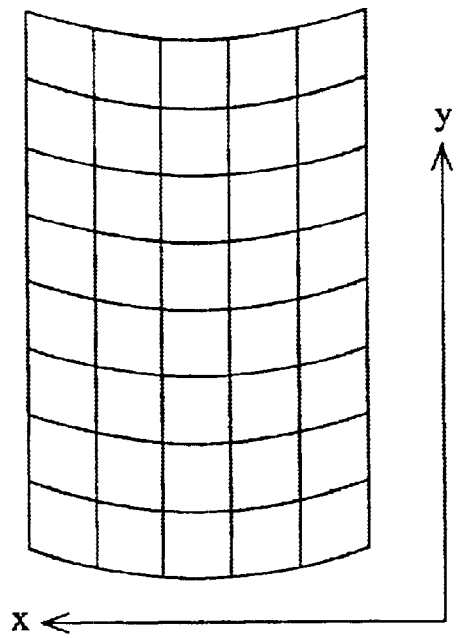
FIGS. 16A and 16B are plan views of simulated images on a camera device respectively.
Figure 16B:
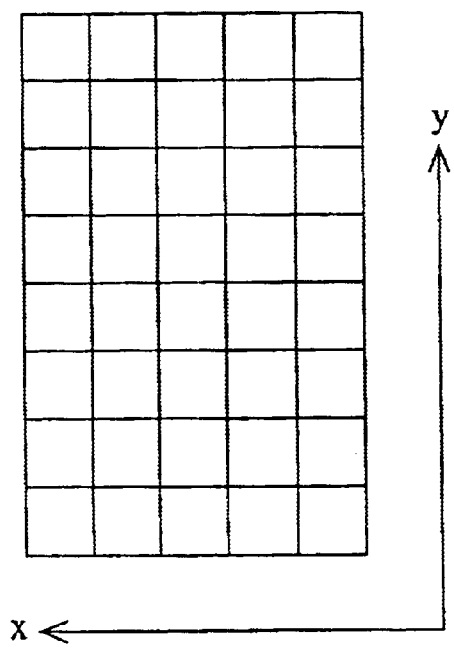

In the embodiment 5, the mirror 2c of the transparent light guide body 2 is a spherical surface, the detection face 2b is a cylindrical shaped side face, and the generatrix is flush with the optical axis of the imaging lens 4. FIGS. 16A and 16B are plane views of simulated images on the camera device 3, respectively. A grid pattern is used as the image. FIG. 16A shows a simulation in which the detection face 2b of the transparent light guide body 2 is not the cylindrical shaped side face. FIG. 16B shows a simulation in which the detection face 2b of the transparent light guide body 2 is the cylindrical shaped side face.

The spherical mirror 2c is inwardly curved, and light derived from points of the detection face 2b and playing a part in the imaging is not parallel to the optical axis of the spherical mirror 2c. Therefore, the height variation occurs at a point where the spherical mirror 2c reflects the light. The image derived from the camera device 3 occurs the distortion as illustrated in FIG. 16A. Therefore, the shape as illustrated in FIG. 14 is used as the detection face 2b, and the generatrix of the detection face 2b extends in the y axial direction as illustrated in FIGS. 16A and 16B. As a result, the height variation does not occur at the point where the spherical mirror 2c reflects the light, and accordingly the distortion of image can be corrected as the simulation of FIG. 16B.

Embodiment 6

Figure 1:
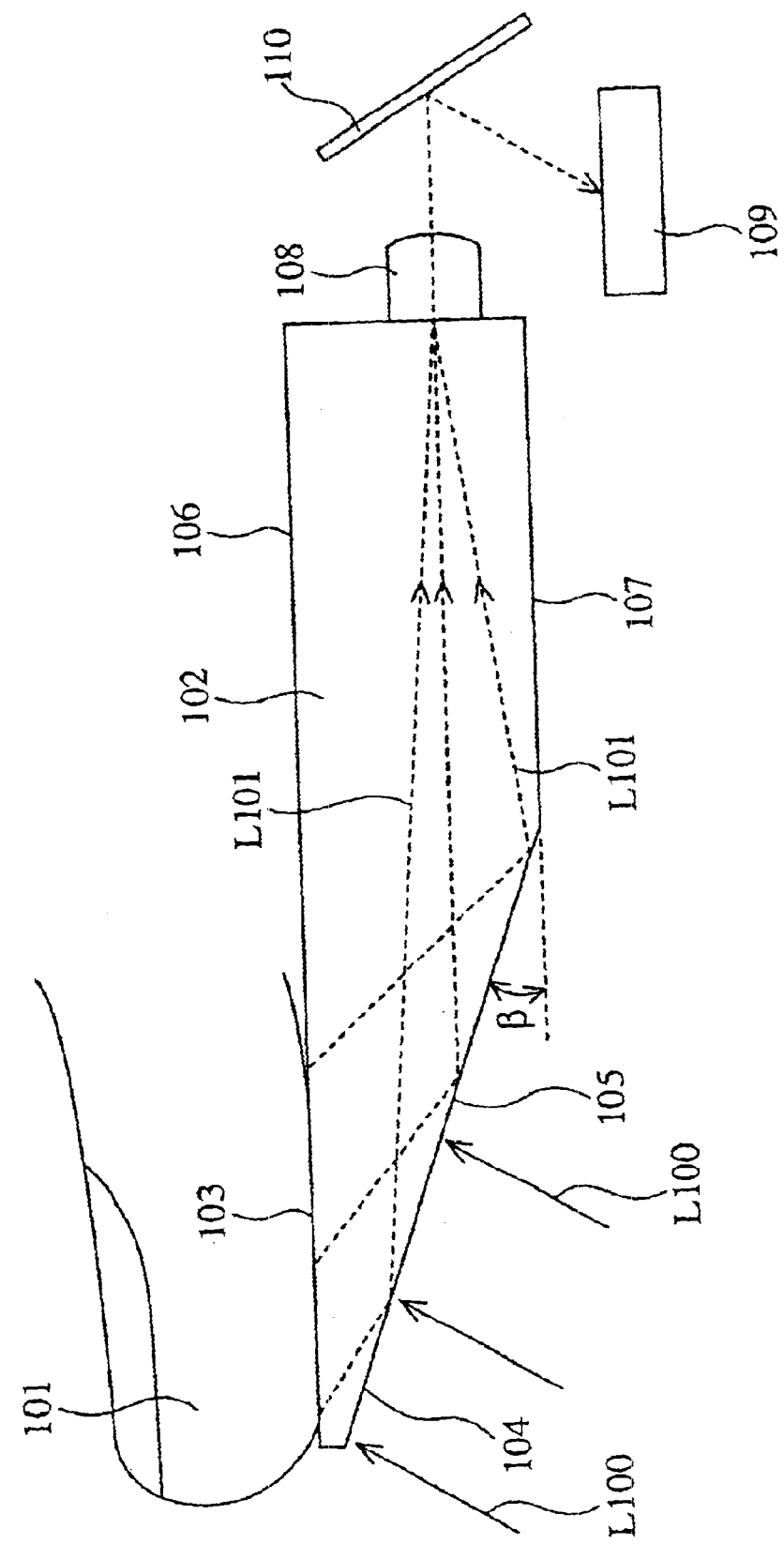
FIG. 1 is a partially sectioned view of the constitution of a conventional irregular pattern detector.
Figure 2:
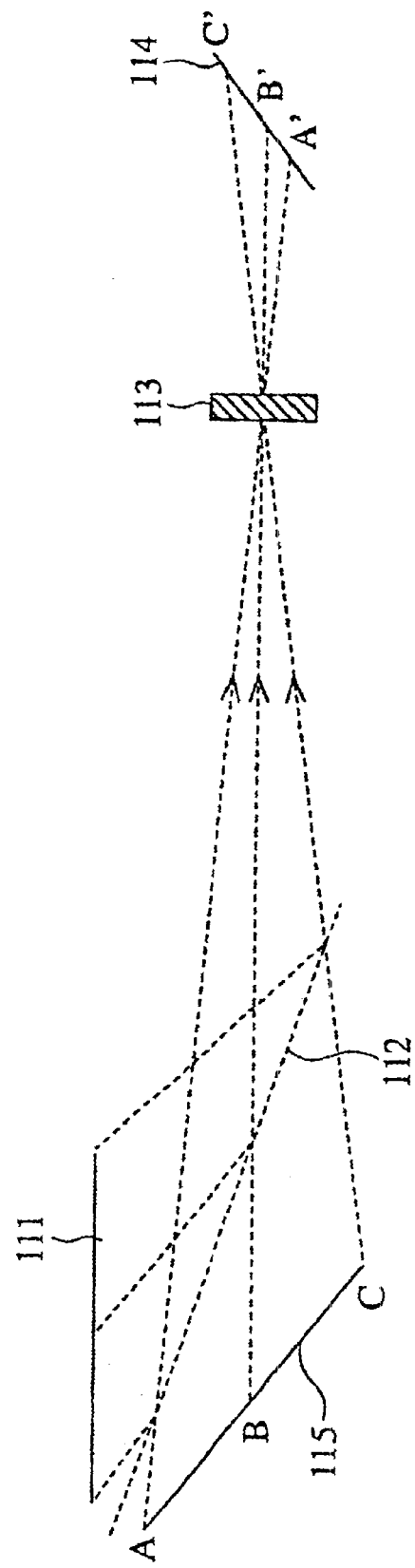
FIG. 2 is a partially sectioned view of a simplified optical system, which is similar to the conventional irregular pattern apparatus as shown in FIG. 1.
Figure 3A:
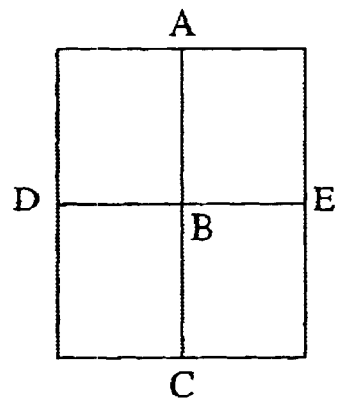
FIGS. 3A and 3B are plan views of images, respectively, in the optical system as shown in FIG. 2.
Figure 3B:
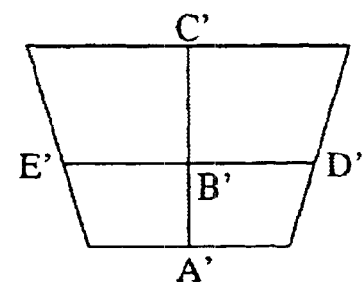
Figure 17:
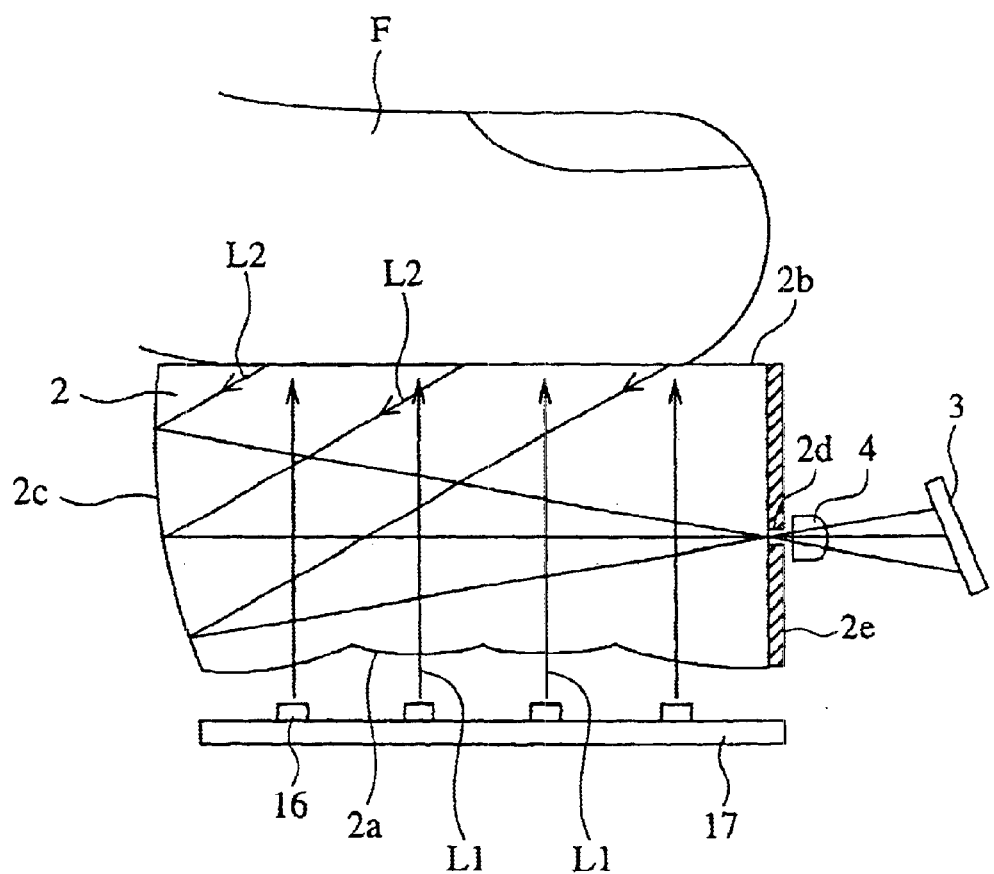
FIG. 17 is a partially sectioned view of the constitution of an irregular pattern detector as embodiment 6 according to the present invention.

FIG. 17 is a partially sectioned view of constitution of an irregular pattern detector as embodiment 6 according to the present invention. Common numerals denote common elements of the embodiment 6 to elements of the embodiments 1 to 5, and the description of such parts is omitted.

The principle of motion used for capturing image of the irregular patterns in the embodiment 6 is the substantially same as that of the embodiment 1.

In the embodiment 6, the light L1 derived from the light-emitting diode array 16 incidents on the detection face 2b through the incident face 2a. Here, since the incident face 2a is constituted by a plurality of curved surfaces, the radiation characteristic of the incident light L1 derived from the respective light-emitting diodes of the light-emitting diode array 16 varies after passing the incident face 2a. With such an arrangement, since it is possible to vary the radiation characteristic of the incident light L1, the intensity distribution of the incident light L1 on the detection face 2b can be optimized. For example, the shading of an image formed on the camera device 3 can be reduced.

In the embodiments 1 to 6, the correction for the trapezoidal distortion, the correction of the magnification of longitudinal and lateral directions and the correction of distortion as illustrated in FIGS. 16A and 16B are explained. The plural correction can be therefore performed by combining the constitution for each correction.

As described above, according to the present invention, the distortion of an image occurring due to miniaturizing the detector can be corrected and a high-quality irregular pattern image can be obtained without any distortion because the curved surface is provided on the transparent light guide body.

According to the present invention, the irregular pattern image can be obtained without any trapezoidal distortion because the spherical mirror forms a telecentric system on the side of the subject, and because the second optical system forms a telecentric system on the imaging side.

According to the present invention, the substantial irregular pattern on the detection face and the irregular pattern image formed on the camera device can be equal in ratios of the longitudinal direction and the lateral direction to indicate accurately the irregular pattern on the detection face.

According to the present invention, the diameter of the imaging lens can be scaled down because it is not necessary to use the telecentric optical system on the imaging side. Therefore, the cost of production of the detector can be reduced, and the detector per se can be miniaturized.

According to the present invention, the distortion in the generatrix direction of cylinder for the detection face can be corrected because the detection face is the cylindrical shaped side face.

According to the present invention, since the camera device is arranged on the common substrate to the light source, it is possible to constitute a plurality of electric circuits on one substrate, and to reduce the cost of production.

According to the present invention, the light-emitting diode array arranged on the substrate is used as the light source of the first optical system, and the incident face of the transparent light guide body is further constituted by a plurality of curved surfaces. It is therefore possible to vary the radiation characteristic of the incident light, the intensity distribution of the incident light on the detection face can be optimized, and the shading of an image formed on the camera device can be reduced, for example.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A pattern detector for capturing images with reduced distortion comprising:

a first optical system having a light source;

a transparent light guide body including an incident face receiving incident light from the light source, a detection face facing the incident face and for placing of a subject having an irregular pattern, a curved surface reflecting scattered light scattered from the detection face, and correcting trapezoidal distortion of an image of a subject placed on the detection face, and an optical absorbing face facing the curved surface and having an opening outputting light reflected from the curved surface; and a second optical system for forming the image by focusing the light from the opening of the optical absorbing face of the transparent light guide body on an image capturing device.

2. The pattern detector according to claim 1, wherein the second optical system corrects longitudinal and lateral magnification of the light from the opening and guides corrected light to the image capturing device.

3. The pattern detector according to claim 1, wherein the detection face of the transparent light guide body has a convex cylindrical surface.

4. The pattern detector according to claim 1, wherein the light source of the first optical system is a light-emitting diode array on a substrate, and wherein the incident face of the transparent light guide body includes a plurality of curved surfaces.

5. The pattern detector according to claim 1, wherein the light source is located on an opposite side of the subject with respect to the transparent light guide body.

6. The pattern detector according to claim 5, wherein the second optical system deflects the light from the opening to guide the light to the image capturing device.

7. The pattern detector according to claim 6, wherein the light source of the first optical system is a light-emitting diode array on a substrate, and wherein the image capturing device is located on the substrate.

8. The pattern detector according to claim 1, wherein the scattered light is directly reflected by the curved surface and guided through the opening to the outside.

9. The pattern detector according to claim 8, wherein the curved surface of the transparent light guide body is a spherical mirror, having a radius between 1.7 to 1.9 times as long as a distance between a central point of the spherical mirror and an intersection of a spherical radius passing through the central point of the spherical mirror and a line extending from a center of the opening and perpendicular to the spherical radius.

10. The pattern detector according to claim 8, wherein the curved surface of the transparent light guide body is a spherical mirror having a radius twice as long as a distance between a central point of the spherical mirror and an intersection of a spherical radius passing through the central point of the spherical mirror and a line extending from a center of the opening and perpendicular to the spherical radius.

11. The pattern detector according to claim 10, wherein the spherical mirror forms a telecentric system on a subject side of the detector, and wherein the second optical system forms a telecentric system on an imaging side of the detector.

* * * * *